Nov. 21, 1933.    L. H. R. HANSEN    1,936,234
OBTUSE ANGLE JOINT
Filed April 16, 1931

Inventor
Leo H. R. Hansen
By Stryker & Stryker
Attorneys

Patented Nov. 21, 1933

1,936,234

UNITED STATES PATENT OFFICE 1,936,234

OBTUSE ANGLE JOINT

Leo H. R. Hansen, St. Paul, Minn.

Application April 16, 1931. Serial No. 530,516

5 Claims. (Cl. 20—92)

It is the object of this invention to provide novel and efficient means for connecting members of buildings or other structures together at a corner where the members meet at an obtuse angle, the device being particularly, although not exclusively, adapted for use in the construction of sectional houses having more than four walls.

A further object is to provide inexpensive means for connecting members of such structures together, and for forcibly drawing the members together to make a tight joint while holding them in proper alignment.

Another object is to provide a joint of this kind which is peculiarly adapted for use with so-called "knock down" or sectional wooden buildings of the multiple side or wall type.

The invention will be best understood by reference to the accompanying drawing in which.

Figure 1:
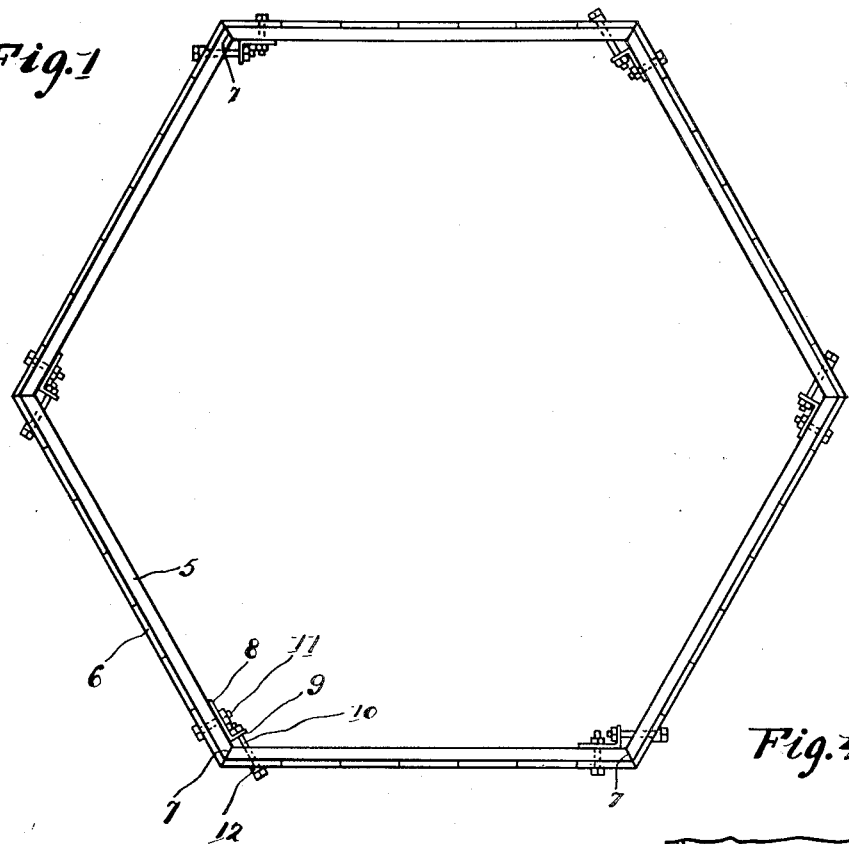
Figure 1 is a plan view of the walls of a sectional building having my improved joints and with the roof removed.
Figure 2:
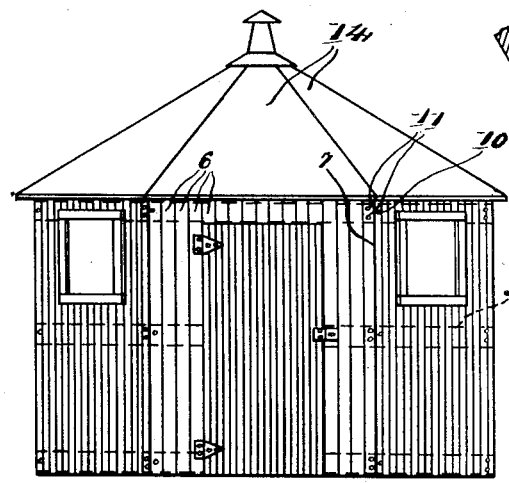
Fig. 2 is a side elevation of the building.
Figures 3, 4:
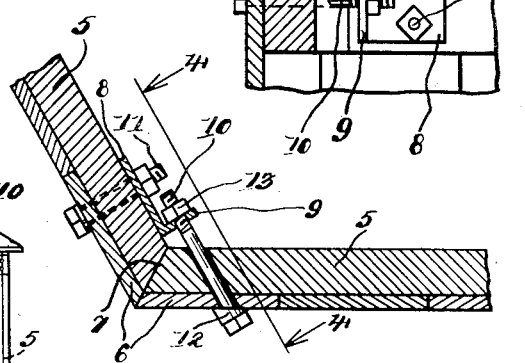
Fig. 3 is a typical enlarged, horizontal section through one of the joints.
Fig. 4 is a fragmentary section taken on the line 4—4 of Fig. 3.

In the drawing, the device is illustrated in connection with a hexagonal building having wall sections composed of horizontal frame members 5 and sheathing 6. At each vertical corner 7 the members 5 and 6 are formed with flat end surfaces, fitting together. To detachably connect the wall sections at each corner, I secure a small metal plate 8 to the inner surface of one of the members 5, the plate 8 having a flange 9 projecting therefrom which is perforated to receive a horizontal bolt 10. The plate 8 is preferably secured to the member 5 by a pair of bolts 11 and the flange 9 projects in a plane perpendicular to the plate 8. The frame member 5 and sheathing 6 of the adjoining wall section has a drill hole for the bolt 10 extending parallel to the plate 8. The said bolt 10 fits tightly in the drilled hole and is provided with a suitable beveled washer 12 on its outer end. The head of the bolt 10 engages the washer 12 and its inner, threaded end is passed through the perforation in the flange 9 and has a nut 13 threaded thereon to engage the flange 9.

As illustrated, the walls of the building are connected together at three points at each corner, where the horizontal frame members 5 meet, and my device may also be employed to connect roof sections 14 to the wall sections. When the device is used in the construction of sectional buildings of the type which are constructed at the factory and shipped in "knocked down", sectional form, the plates 8 may be secured to the frame members at the factory, or the several sections may be merely drilled for the bolts 10 and 11 before shipping. In either case, the erection of the building is quickly and easily accomplished. After the plate 8 has been secured to one of the members 5 which meet at a corner it is only necessary to insert the bolt 10 in the adjoining frame member 5 and flange 9 and to apply the nut 13. When this nut is tightened the adjoining sections are forcibly drawn together to form a tight joint.

Where the device is employed in the construction of portable buildings it has the further advantage of permitting repeated tightening of the joint to compensate for distortion which is sometimes caused by moving the building from place to place while erected. The long, tight fitting bearing afforded by the oblique drill hole in the member 5 and sheathing 6 for the bolt 10 prevents any lateral displacement of one wall section relative to the adjoining one and strength of the joint is promoted by my arrangement of the bolts 10 and 11 which engage the wood frame members and sheathing at points well removed from the corners 7.

Having described my invention, what I claim as new and desire to protect by Letters Patent is:

1. A joint for sectional buildings having in combination two thick frame members extending at an obtuse angle to each other, a plate secured to one of said members within the angle formed by the inner surfaces of said members, a flange on said plate projecting in spaced relation to the second of said members, said flange having a perforation therethrough and said second member having a bore adapted to register with said opening, and a rigid, threaded member extending in said bore and perforation and fitting snugly in said bore to connect said flange to said second member, said frame members having corner surfaces arranged to be drawn together by the tightening of said threaded member.

2. A joint for sectional buildings having in combination two members to be joined extending at an obtuse angle to each other, a plate secured to one of said members within the angle formed by the inner surfaces of said members, a flange on said plate projecting substantially at right angles thereto and in spaced non-parallel relation to said second member, said flange having a perforation for a bolt and said second member having an obliquely extending bore in registry with said flange perforation and a bolt fitting snugly in said bore and connecting said flange to said second member, said members having corner surfaces formed to be drawn together by the tightening of said bolt.

3. A joint having in combination building sections to be joined at an obtuse angle to each other and each comprising a panel having a transversely extending frame member, said frame members being arranged to be joined end to end at the joint, a plate secured to one of said members near the end of the same and within the angle formed by the inner surfaces of said members, a flange on said plate, said flange having a perforation for a bolt and the other of said members having a bore in alignment with said perforation and in perpendicular relation to said flange and a bolt extending through said last mentioned member, bore and perforation and fitting snugly in said bore, said members having surfaces formed to be drawn together by tension applied to said bolt.

4. A joint having in combination building sections to be joined at an obtuse angle to each other and each comprising a panel having a transversely extending frame member, said frame members being arranged to be joined end to end at the joint, a plate secured to one of said members near the end of the same and within the angle formed by the inner surfaces of said members, a flange on said plate projecting in oblique relation to the other of said members, said flange having a perforation for a bolt and the other of said members having a long bore in alignment with said opening and in perpendicular relation to said flange and a bolt fitting snugly in said bore and connecting said flange with said second member, said members having surfaces formed to be drawn together by tension applied to said bolt.

5. A joint having in combination building sections to be joined at an obtuse angle to each other and each comprising a panel having a transversely extending frame member, said frame members being arranged to be joined end to end at the joint, a plate secured to one of said members near the end of the same and within the angle formed by the inner surfaces of said members, a relatively short, rigid flange on said plate, projecting in spaced relation to the other of said members, said flange having a perforation for a bolt and the second member having a long bore in alignment with said perforation and in perpendicular relation to said flange and a bolt fitting snugly in said bore and connecting said flange to said second member, said members having surfaces formed to be drawn together by tension applied to said bolt and said flange being sufficiently rigid to remain in spaced relation to said second member when said bolt is tightened.

LEO H. R. HANSEN.